310-13 SR
FIP8502 XR 4,040,445

United States Patent [19] [11] 4,040,445
McCormick [45] Aug. 9, 1977

[54] ELECTRICAL LINEAR FORCE MOTOR FOR SERVO CONTROLS, FLUID VALVES, AND THE LIKE

[75] Inventor: Joseph F. McCormick, Pawling, N.Y.

[73] Assignee: Murray A. Ruben, Belmont, Mass.

[21] Appl. No.: 633,493

[22] Filed: Nov. 19, 1975

Related U.S. Application Data

[63] Continuation of Ser. No. 458,714, April 8, 1974, abandoned.

[51] Int. Cl.[2] .................... F15B 13/044; F16K 31/05
[52] U.S. Cl. .................... 137/596.18; 91/375 R; 137/625.65; 251/129; 251/130; 251/335 B; 310/13
[58] Field of Search .................... 251/129, 130, 335 B; 310/13, 27; 91/375 R; 137/625.65, 596.18

[56] References Cited

U.S. PATENT DOCUMENTS

| | | | |
|---|---|---|---|
| 1,624,736 | 4/1927 | Hutt | 251/129 X |
| 2,520,430 | 8/1950 | Pearson | 251/335 B X |
| 2,521,557 | 9/1950 | Wyckoff | 91/375 R X |
| 2,559,116 | 7/1951 | Doschek | 251/130 |
| 2,923,521 | 12/1960 | Ray | 251/129 X |
| 3,530,888 | 9/1970 | Cable | 137/624.11 |
| 3,596,873 | 8/1971 | Eufusia | 251/140 X |

FOREIGN PATENT DOCUMENTS

| | | | |
|---|---|---|---|
| 243,930 | 12/1965 | Austria | 137/625.65 |
| 1,240,632 | 4/1960 | France | 137/625.65 |
| 813,411 | 9/1951 | Germany | 91/52 |
| 264,869 | 6/1970 | U.S.S.R. | 251/129 |

*Primary Examiner*—Alan Cohan
*Assistant Examiner*—Gerald A. Michalsky
*Attorney, Agent, or Firm*—Mandeville and Schweitzer

[57] ABSTRACT

The invention relates to an electro-mechanical force motor device for converting a controlled electrical input signal into a mechanical movement, particularly for actuation of a hydraulic pilot or servo device. The basic component of the invention is a linear electric force motor with its principal components coaxially disposed and arranged to achieve linear mechanical displacement in accordance with an applied signal of voltage. The armature or coil element of the linear force motor is coupled to a double-acting bellows, which not only serves as a double-acting return spring, but also totally isolates the magnetic and electro magnetic elements of the force motor from the controlled system. This is of particular significance in connection with the electro-hydraulic pilot and servo devices, for example, in which the circulating hydraulic fluid inevitably contains suspended magnetic particles which otherwise can eventually accumulate on the magnetic components of the force motor and impede its normal functioning.

11 Claims, 4 Drawing Figures

ELECTRICAL LINEAR FORCE MOTOR FOR SERVO CONTROLS, FLUID VALVES, AND THE LIKE

This is a continuation of application Ser. No. 458,714, filed Apr. 8, 1974, now abandoned.

BACKGROUND AND PRIOR ART

A variety of mechanisms are available for converting a controlled electrical input signal into a variable, controlled output of an hydraulic device. Typical, such devices are reflected in, for example, the Moog U.S. Pat. Nos. 2,625,136, 2,931,343 and 3,228,423, Paine U.S. Pat. No. 2,832,318, Nelson U.S. Pat. No. 3,001,549, Hawk U.S. Pat. No. 3,430,656, Markson U.S. Pat. No. 2,904,075, Arnett U.S. Pat. No. 3,182,561, Andrews U.S. Pat. No. 3,457,956, Orloff U.S. Pat. No. 3,027,917, O'Brien U.S. Pat. No. 3,323,090, and Lantz U.S. Pat. No. 2,836,154, as well as the McCormick U.S. Pat. Nos. 3,498,329 and 3,516,441. While many of these prior art mechanisms have a certain level of operability, all suffer from significant disadvantages, either operational or economical, or both. Most are quite complex and therefore extremely costly to manufacture, severely limiting their practical utilization. Others have significant operational shortcomings, in terms of non-linearity, inability to stand up under industrial conditions, or the like.

SUMMARY OF THE INVENTION

The present invention provides a unique linear force motor, suitable particularly for electro-hydraulic pilot or servo devices, which is not only very economical to manufacture, but is extremely reliable in operation. The mechanism of the invention is highly simplified in nature, such that it may be produced at relatively low cost. And, with less mechanical complication, operating and maintenance advantages are realized.

In accordance with one of the specific features of the invention, an electrical linear force motor arrangement is coupled through a balanced, double-acting linear bellows to a linear output element, typically an hydraulic pilot or servo valve. The arrangement of the parts is such that the electrical coil and magnetic components associated therewith are completely isolated from the linear output element by the double-acting bellows. The bellows is selected to have a predetermined spring characteristics such that it serves both as a double-acting return spring and as an isolating barrier.

Because of the complete isolation of the electrical coil area from the output element, the coil is not exposed to hydraulic fluid from the controlled system which substantially reduces maintenance problems and improves operation.

The electro-mechanical linear force motor of the invention, while highly simplified in its basic structure and operation, still provides a high degree of versatility in its use, including simple and reliable arrangements for effecting zero-set adjustment, and provision for manual override.

The basic force motor is ideally suited for utilization for a wide variety of electro-hydraulic combinations.

For a better understanding of the above and other features and advantages of the invention, reference should be made to the following detailed description and to the accompanying drawings.

DESCRIPTION OF PREFERRED EMBODIMENT OF THE INVENTION

Figure 1:
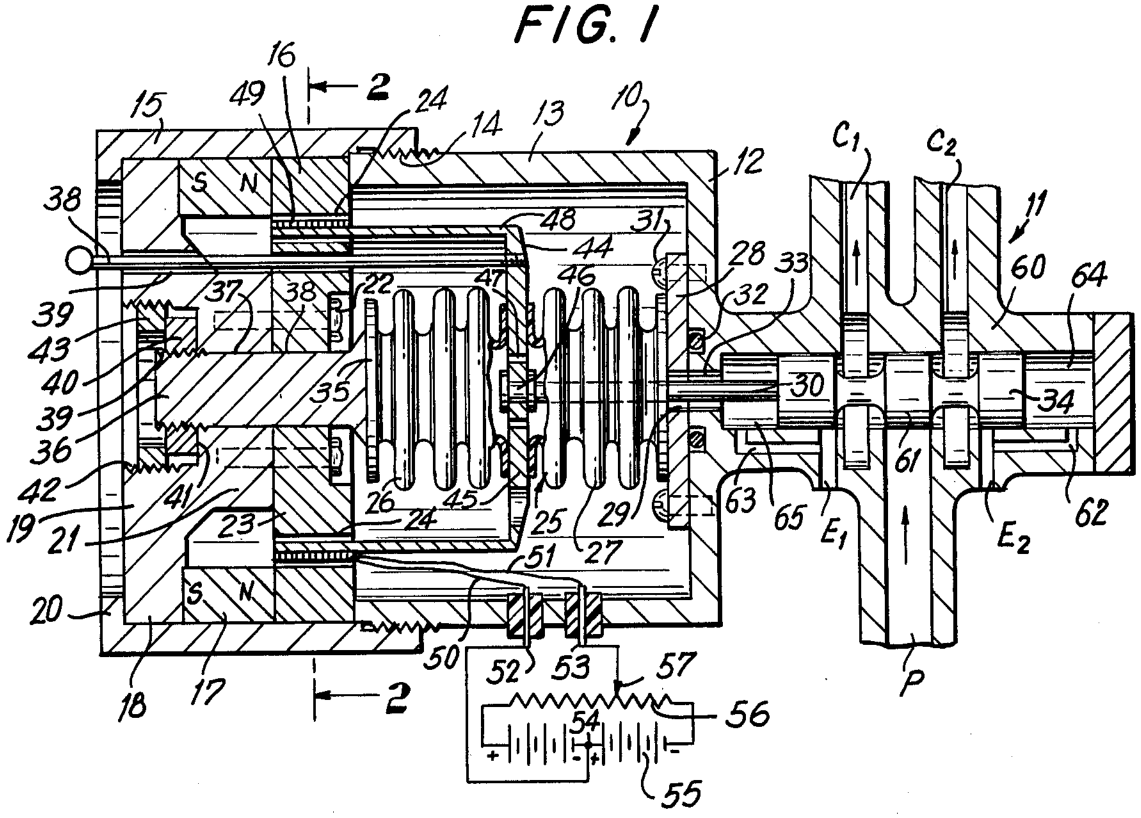
FIG. 1 is a longitudinal cross sectional view of an electro-hydraulic flow proportional pilot valve incorporating the features of the invention.
Figure 2:
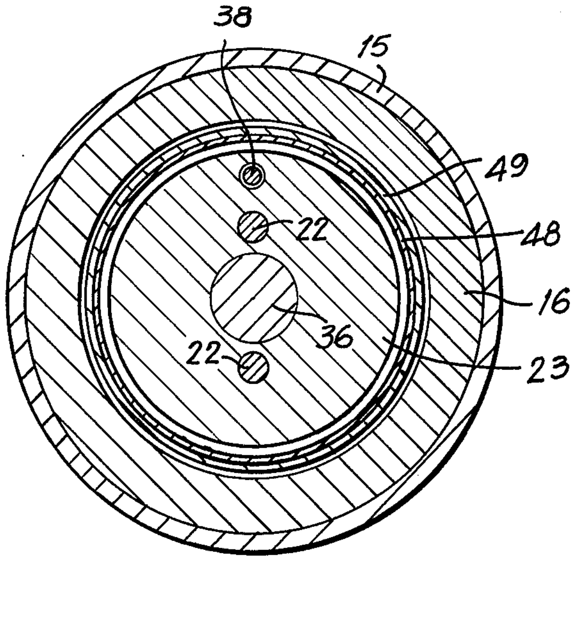
FIG. 2 is a cross sectional view taken generally along the line 2—2 of FIG. 1.

Referring now to the drawing, and initially to FIGS. 1 and 2 thereof, there is illustrated an electro-hydraulic flow proportional valve assembly, in which the flow of hydraulic fluid through a valve is proportional to an applied signal voltage. The mechanism includes a linear electrical force motor section 10, coupled to a utilization device in the form of a four-way fluid valve 11. In the illustrated arrangement, a single casting 12 houses portions of both the valve and force motor, although such integral relationship is not significant to the invention.

In the force motor section 10, the casting 12 includes a cylindrical motor housing 13, provided with threads 14 at its open end to receive a threaded cylindrical end cap 15. An annular magnetic pole piece 16 is received within the cap 15, seated against the end of the housing 13. An annular permanent magnet 17 is seated against the annular pole piece 16 and is in contact with flanges 18 of a magnetic base member 19. The flanges 18 of the base member are engaged by inturned flanges 20 of the cylindrical cap 15 such that, when the cap is secured tightly on the housing 13, the pole piece 16, magnet 17, and magnetic base 19 are tightly clamped in place. The base 19 is provided with an inwardly projecting cylindrical core 21, to which is secured by bolts 22 or other suitable means, a disc-like section 23 of magnetic material. The section 23 is positioned concentrically within the annular or outer pole piece 16, and comprises an inner pole piece of a magnetic flux circuit. The two pole pieces 16, 23 define between them a predetermined annular air gap 24. In this respect it will be noted that the permanent magnet element 17 is axially polarized, such that the outer pole piece 16 constitutes one pole, while the inner pole piece 23 constitutes an opposite pole of the magnetic circuit.

Mounted within the motor housing 13, in accordance with the invention, is an hydraulic bellows assembly 25, consisting of axially aligned, opposed, balanced bellows sections 26, 27. At one end the bellows assembly 25 is secured to a mounting plate 28, having an aperture 29 communicating with the interior of the bellows assembly and receiving a rod-like operating element 30. The bellows mounting plate 28 may be secured to the housing 13 by bolts 31, with a fluid-tight seal being provided between the housing 13 and the mounting plate, surrounding the opening 29, by means of a suitable O-ring or the like 32.

The bellows assembly 25 incorporates a commercially available form of accordion-like metallic bellows spring, as manufactured and sold by Robertshaw Controls, under Part A00936A21. The bellows spring, typically, is formed of a tubular section of vermilion copper, having a wall thickness of, for example, 0.0045 inch.

The tubular section is hydraulically shaped over a suitable mandril, to provide the desired accordion-like configuration, and then is appropriately heat treated to achieve spring characteristics, all in accordance with generally known manufacturing techniques.

The bellows spring should be placed under an initial pre-compression (or, pre-tension) such that, at all times the bellows is operating in a state of compression (or tension) within the operating range of the device. It is intended that the bellows not be actuated through its "mechanical zero" condition, as the linearity of the output would be adversely affected. In a small size unit, a bellows assembly may have an over-all nominal length of about 1.062 inch, and this may be pre-compressed to an over-all length of about 1.000 inch.

As shown in FIG. 1, the operating element 30 projects through the plate opening 29, and also through an opening 33 into the valve housing, for operating an hydraulic valve spool or plunger 34, as will be described hereafter.

At its opposite end, the bellows assembly 25 is sealed off by an end plate 35 to which an adjusting pedestal 36 is secured. The adjusting pedestal 36 is slidably received in aligned openings 37, 38 in the base member 19 and pole piece 23, respectively, and has a threaded outer end portion 39 engaged by a nut 40. The position of the bellows end plate 35 relative to the motor housing 13 may be adjusted by manipulation of the nut 40, which is held seated against a shoulder 41 forming the bottom of a threaded recess in the base member. An externally threaded collar 43 engages the threaded recess and bears against the outer end surface of the adjusting nut 40, retaining it in position against the end surface 41 of the recess.

In the mechanism illustrated in FIG. 1, a cup-like armature member, generally designated by the numeral 44, is received within the housing 13 and has a bottom plate element 45 forming an apertured center wall of the bellows assembly 25, to which the rod-like operating member 30 is anchored at 46. Suitable axial openings 47 are provided in the plate 45, within the bellows assembly 25, to prevent a build-up within the bellows of any fluid pressure differentials between the bellow sections 26, 27.

Externally of the bellows assembly, the plate 45 is connected to a cylindrical cup wall 48, which is coaxial with the operator 30, the bellows assembly 25 and the annular air gap 24. The cup wall 48 extends into the air gap and mounts an electrical coil 49. The coil 49 consists of an appropriate number of turns of fine wire wound about the cylindrical armature wall 48 and forming a coaxial coil symmetrically received within the air gap 24. The ends of the coil form leads 50, 51 connected to terminals 52, 53, which are accessible externally of the motor housing 13. In intended operation, one lead (e.g., 50) is connected to the neutral or midpoint 54 of a DC voltage supply 55, which is connected to a resistor element 56 of a voltage dividing potentiometer. The slide wire element 57 of the potentiometer is connected to the other terminal 51.

When the slide wire 57 is in its neutral or mid position, no voltage is developed across the coil 49, and thus, no current flows therein. As the slide is moved off of its neutral position in either direction, a voltage will be applied to the coil, and the polarity and level of such voltage will be a function of the direction and amplitude of displacement of the slide wire. When a current is thus caused to flow in the coil 49, the armature 44 will be urged to move relative to the magnetic pole piece 16, 23, in one axial direction depending upon voltage polarity. When the coil is thus displaced, it will act through the cylindrical wall 48 and plate 45 to compress one side of the bellows assembly while extending the other. The metallic bellows assembly 25, having a constant linear spring rate within the operational range of the apparatus, will thus permit linear axial movement of the armature 44 and the operating element 30, which is directly proportional to the amplitude of the current in the coil.

In the device illustrated in FIG. 1, the operating element 30, which is driven by the force motor, is connected to the hydraulic valve spool 34. The valve housing 60, within which the spool is slidably guided, includes a pressure inlet port P, a pair of exhaust ports E1, E2, and a pair of control ports C1, C2. In the neutral position of the valve spool, its central land 61 isolates the pressure port P, as well as the exhaust ports E1, E2, from the two control ports. However, if the spool is shifted to the right, in response to electrical energization of the force motor, the exhaust port E2 is partly opened to the control port C2, and the pressure port P is partly opened to the control port C1, providing for a controlled flow of pressure fluid to the port C1 and a controlled flow of exhaust fluid from the control port C2. The volume of such flow will, of course, be a function of the linear displacement of the valve spool 34, which in turn is a linear function of the voltage applied to the coil 49 by means of a slide wire 57. And thus, the controlled fluid flow is directly proportional to the electrical signal applied.

As will be readily understood, energization of the coil 49 with a voltage of opposite polarity, will displace the armature to the left, directing pressure fluid into the control port C2 and permitting exhaust fluid to flow from the control port C1, with the flow again being proportional to the voltage applied to the coil 49.

In the neutral or unenergized condition of the coil 49, the valve spool desirably is precisely centered in relation to the various exhaust ports and the pressure ports. To achieve this condition, the bellows-supporting pedestal 36 may be adjusted axially, as required, and then fixed in position by the locking nut 40 and threaded collar 43.

Unbalanced hydraulic forces on the valve spool 34 are prevented by providing open exhaust passages 62, 63 communicating with end chambers 64, 65 of the valve housing, so that there can be no build-up of hydraulic pressure within these chambers. It will be noted, in this respect, that the interior of the bellows assembly 25 is open to the valve end chamber 65 and thus could be exposed to the fluids leaked by the end of the valve spool. However, in accordance with the invention, the presence of any such fluids cannot affect the force balance of the unit. Importantly, operating fluid is completely isolated by the bellows assembly 25 from the area of the coil and magnetic gap 24, so that the gap does not become contaminated by fluid-borne magnetic particles.

It should be understood that the bellows assembly 25 does not require the use of a full central plate 45, forming in effect separate left and right bellows sections 26, 27. It is quite sufficient, for the purposes of the invention, for the bellows assembly to comprise a single elongated metallic bellows unit, with the cylindrical armature wall 48 being secured to the exterior of the bellows wall, at its midpoint. The manner of such securing should be such that the armature wall is attached to circumferentially spaced points, so that the force relationship between the cup wall 48 and the bellows is symmetrically distributed, relative to the principal longitudinal axes of the unit. This assures that there is no tendency to tilt or skew the bellows, when the force motor is energized. In such cases, the operator element 30 is likewise secured to the interior of the bellows unit at a plurality of circumferentially spaced points in substantially the same plan that the armature wall 48 is secured.

As will be understood, the principles of the invention are applicable to the use of the basic force motor unit in conjunction with a variety of output devices, of which the flow proportional valve 11 is only illustrative. By way of further example, another advantageous form of output device is the rotary servo actuator arrangement illustrated in FIGS. 3 and 4.

Figure 3:
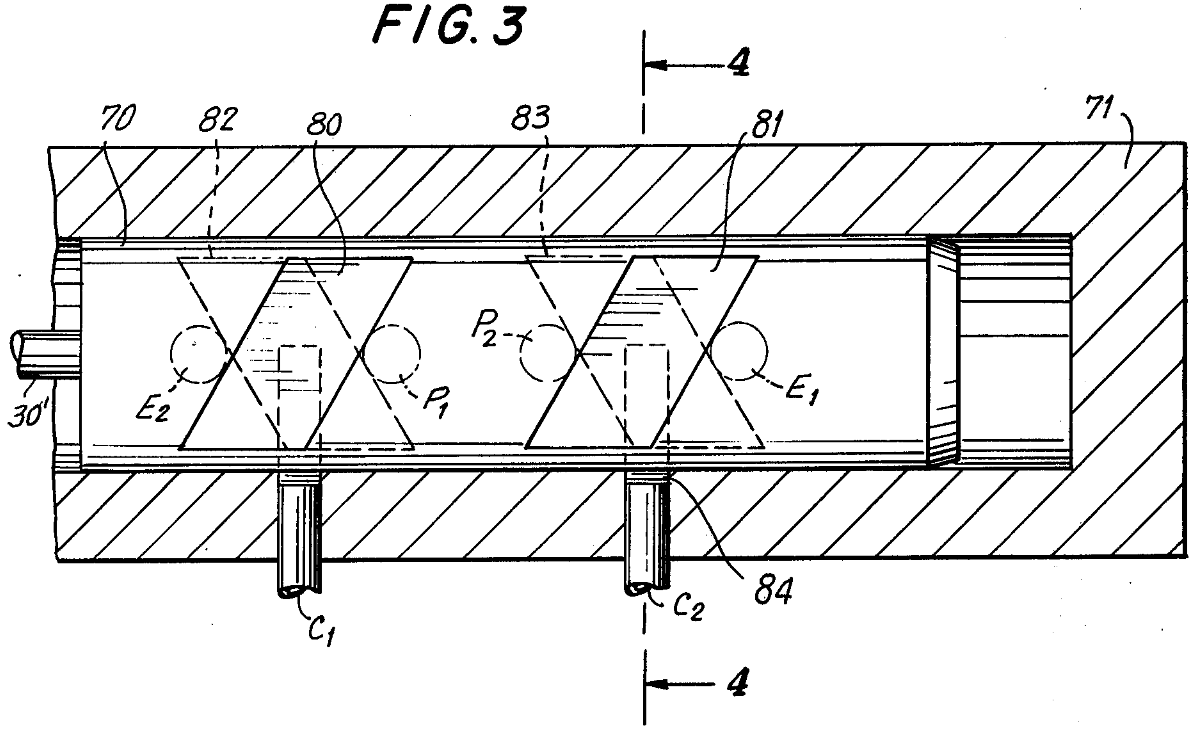
FIG. 3 is a fragmentary, longitudinal cross sectional view of a linear-to-rotary servo mechanism incorporating features of the invention.
Figure 4:
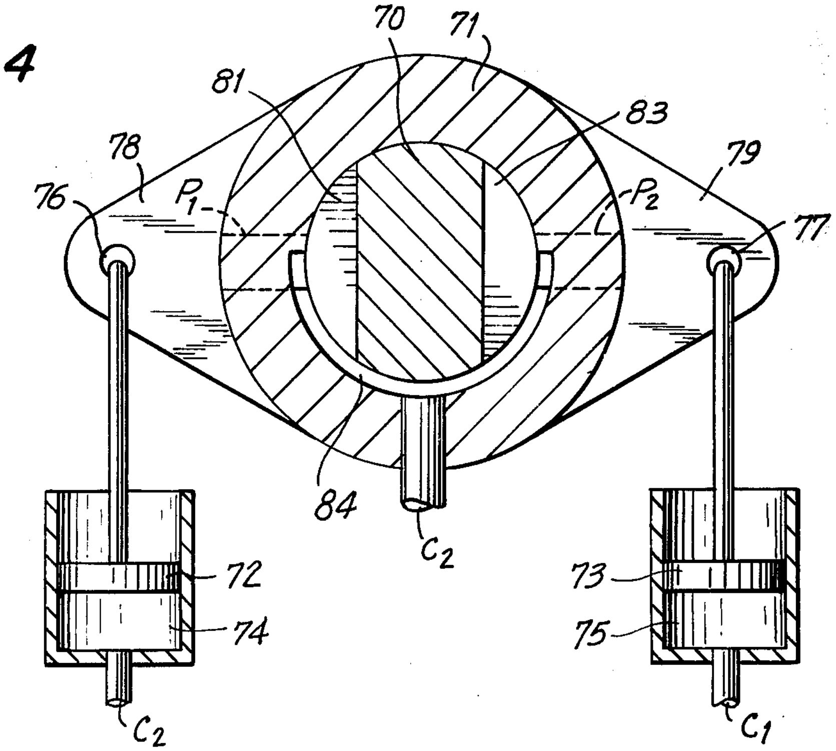
FIG. 4 is a fragmentary cross sectional view taken generally along the line 4—4 of FIG. 3.

FIG. 3 shows the actuator in longitudinal cross section, with the linear force motor section 10 removed. However, it will be understood that the unit of FIGS. 3 and 4 is coupled to a linear force motor 10 as by means of a linear operator element 30', corresponding to the element 30 of FIG. 1. The operator element 30' is connected to a valve spool 70 slidable linearly in a valve housing 71. In accordance with the invention, the valve spool 70 is non-rotatably secured to the operating element 30', which in turn is non-rotatably mounted by the bellows assembly of the force motor, such that the valve spool is movable along its axis but is not rotatable about its axis. The actuator housing 71, on the other hand, is mounted by suitable thrust bearing means, (not shown) for rotary movement about the spool 70, while being retained against axial movement.

FIG. 4 illustrates the housing 71 in its neutral or balanced rotary position relative to the valve spool 70. It is retained in such position by pistons 72, 73 of hydraulic servo actuator units 74, 75 respectively, which are connected at 76, 77 to opposed lever arms 78, 79 secured to the rotary housing 71.

As reflected in FIG. 3, the spool 70 is provided on one side with a pair of diagonally disposed machined or ground recesses 80, 81, providing recessed flow passages. On the opposite side of the spool, similar diagonally disposed recesses 82, 83 are provided. Fluid control ports C1, C2 are provided in the valve housing 71, connected to arcuate recesses 84 (FIG. 4). The axial dimension of the diagonally disposed spool recesses 80–83 is such that, in any linear position of the valve spool 70, within its operating range, an appropriate one of the recesses 80 or 82 will communicate with the control port C1 and an appropriate one of the spool recesses 81 or 83 will communicate with the control port C2. Likewise, the circumferential length of the housing recess 84 is such that the appropriate spool recesses will remain in communication with the associated control port in any rotary position of the valve housing 71 within its operating range.

The "near" side of the valve housing, as reflected in FIG. 3, is provided with a pressure port P1 and an exhaust port E1 which, in the neutral positions of the spool 70 and the housing 71 are immediately adjacent the right-hand side edges of the diagonal flow recesses 80, 81, and approximately centered between the upper and lower limits of these recesses as viewed in FIG. 3. Thus, any axial movement of the spool 70 to the right will put the control port C1 in communication with the pressure port P1, through the recess 80, and will put the control port C2 in communication with the exhaust port E1, through the passage provided by the recess 81.

On the opposite side of the valve housing 71, an exhaust port E2 and pressure port P2 are provided immediately adjacent the left-hand edge extremities of the diagonal recesses 82, 83, approximately midway between the upper and lower limits thereof as viewed in FIG. 3. Thus, movement of the spool 70 left, from the balanced position illustrated in FIG. 3, will put the control port C1 in communication with the exhaust port E2, through the recess 82, and will put the control port C2 in communication with the pressure port P2, through the recess 83.

As reflected in FIG. 4, the control ports C1, C2 are connected, respectively, to the actuators 74, 75. Thus, if the spool 70 is shifted to the right in FIG. 3, by application of an electrical signal by the force motor, the recesses 80, 81 will operlap, respectively, the pressure port P1 and exhaust port E1, admitting pressure fluid into the control port C1 and permitting exhaust fluid to flow through the control port C2. Pressure fluid flowing through the control port C1 enters the actuator 75 and rotates the housing 71 in a counterclockwise direction, as viewed in FIG. 4. By reason of the diagonal disposition of the spool recesses 80, 81, continued counterclockwise rotation of the valve housing 71 will eventually move the valve ports P1, E1 out of communication with the respective spool recesses 80, 81. As will be readily understood, the extent of rotary movement of the housing 71 is required to re-close the ports E1, P1 and restore a neutral hydraulic balance will be directly proportional to the extent of linear displacement of the spool 70. Thus, rotary displacement of the unit 71 will be a direct function of the electrical signal applied to the force motor. In this respect, energizing the force motor with an opposite polarity will cause the spool to shift to the left, bringing the recesses 82, 83 in communication with the ports P2, E2 respectively, at which time control port C2 contains pressure fluid and control port C1 is connected to exhaust. This will bring about a clockwise rotation of the housing 71, proportional to the leftward displacement of the spool 70, until hydraulic balance is restored.

The basic linear force motor unit 10, regardless of the utilization device to which it is connected, constitutes a substantial improvement over available devices for these purposes. A significant feature of the device is the use of a double-acting bellows arrangement, connected in coaxial relationship to an electrical driving coil and serving to completely isolate the coil from an operating or output element, which is also secured to the bellows arrangement in concentric relation with both the bellows and the driving coil. The arrangement accommodates an advantageous association of the force motor with a wide variety of utilization devices. To great advantage, these utilization devices may be hydraulic servo or pilot units, which can be operated to respond with precision to controlled electrical input to the driving coil of the force motor.

In the illustrated system, the driving coil is disposed concentrically outside of the bellows while the operating element is arranged coaxially within the bellows. In principle, this association could be reversed, the significant relationship being that the bellows serves to completely isolate one from the other, thus permitting the driving coil to operate in a "dry" condition, free of exposure to hydraulic fluids, for example, flowing in a utilization device.

The force motor unit of the invention is of an inherently simplified construction, providing for a highly economical manufacture. At the same time, however, it is extremely reliable in operation, and provides for a highly precise response by way of a linear displacement of the operator 30 in direct proportion to the level of the voltage applied.

In the illustrated forms of the invention, the utilization devices are, respectively, a flow proportional control valve (FIGS. 1 and 2) and a rotary servo actuator (FIGS. 3 and 4). The flow proportional control device serves to provide for a controlled flow of hydraulic fluid as a direct function of the level and polarity of the applied voltage. The rotary servo actuator provides for a precise rotary displacement of a control element as a direct function of linear displacement of the force operating element, which in turn is a direct function of the level and polarity of the voltage applied.

One of the significant advantages of the new force motor unit resides in the fact that all of the movable components are concentrically aligned on the principal longitudinal axis and arranged for movement in the direction of such axis. Thus, the mechanical movements have a direct linear relationship to the applied electrical signal, over the full operating range of the device, as distinguished from, for example, the class of prior art device in which electrical input signals are utilized to effect pivotal displacement of a lever-like element, such that linearity of the mechanical output in relation to the electrical signal input can only be approximated.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A two-way, linear proportional force motor unit for directly operating an hydraulic utilization device, comprising a. a permanent magnet connected to magnetic pole pieces and defining an air gap containing a permanent magnetic flux, b. an electrical winding in said air gap, c. a mechanical coil support for said electrical winding, d. a balanced, prestressed, double-acting resilient metallic bellows e. said mechanical coil support being connected to said bellows at its effective midpoint from without said bellows whereby said electrical winding is external of said bellows, f. said bellows being prestressed in an amount greater than the operating displacement of said mechanical coil support, whereby said bellows is unidirectionally stressed at all times under normal working conditions, g. operator means projecting coaxially of the bellows within the confines of said bellows to an exterior point for connection to said utilization device and operatively associated with said mechanical coil support, h. said bellows being sealed at one end and in sealed communication at its other end with said hydraulic utilization device, whereby said bellows serves to isolate said air gap from the fluid of said hydraulic utilization device independently of sliding-type seals.

2. The linear proportional force motor of claim 1, further characterized by a. said bellows being prestressed in compression.

3. A linear proportional force motor according to claim 2, further characterized by a. said mechanical coil support comprising a cup-like member, b. said double-acting bellows comprising a pair of similar bellows members, positioned one on each side of the closed end of said cup member and being secured thereto, c. said operator being connected to said closed end within the confines of said bellows and projecting coaxially of the bellows to an exterior point for connection to a utilization device.

4. A linear proportional force motor according to claim 2, further characterized by a. one axial end of said bellows being secured in a position normally fixed in relation to said annular air gap, b. a pedestal for mounting the other end of said bellows, and c. means for adjustably positioning said pedestal along the axis of said bellows, for varying the neutral position of said bellows and said electrical coil.

5. A linear proportional force motor according to claim 1, further characterized by a. an exterior housing surrounding said bellows and said mechanical coil support, b. said bellows being closed at one end and sealed to said housing at its other end, c. said housing having an opening therein communicated with the sealed end of said bellows, d. said operator projecting through said opening, into the interior of said bellows, and being connected to the effective midpoint of said bellows.

6. A two-way, linear proportional force motor unit for directly operating an hydraulic utilization device, comprising a. a force motor housing, b. an hydraulic utilization device connected to said housing, c. operator means for said hydraulic utilization device extending through said housing and movable relative thereto for activating said utilization device, d. means in said force motor housing forming a magnetic air gap, e. an electrical winding movable axially in said air gap, f. the axes of said air gap and electrical winding being parallel to the effective axis of said operator means, g. a balanced, prestressed, double-acting resilient metallic bellows supported at its ends in said force motor housing, h. means mechanically connecting said electrical winding to the effective midpoint of said bellows whereby upon energization of said winding said midpoint will be displaced axially through a distance and in a direction which is substantially a linear function of the electrical current energizing said winding, i. said bellows being initially prestressed in an amount greater than the maximum intended displacement of said midpoint, whereby said bellows remains under at least limited prestress in all normal operating positions, j. that portion of said operator means extending within said housing, being entirely within the confines of said bellows and being connected to said bellows midpoint from within the said bellows and said electrical winding being connected to said midpoint outside said bellows, and k. said bellows, at its ends, being in sealed relation to said force motor housing, whereby said air gap and electrical winding are completely isolated from said hydraulic utilization device.

7. A linear proportional force motor unit according to claim 6, further characterized by a. said operator means comprising a rod-like element extending axially into the interior of said bellows from one end thereof and connected to the bellows midpoint from within.

8. A linear proportional force motor unit according to claim 7, further characterized by a. one end of the bellows being adjustably movable axially relative to said housing, whereby to accommodate adjustment of the neutral midpoint of said bellows.

9. A linear electrical force motor according to claim 6, further characterized by a. an hydraulic valve device is connected to said force motor, b. said valve device including a movable member connected to said operating element.

10. A linear electrical force motor according to claim 9, further characterized by a. said movable valve member is mounted coaxially with said operating element for controlled linear movement therewith.

11. The linear proportional force motor according to claim 6, further characterized by a. said hydraulic utilization device comprising a first movable valve member and a second movable valve member being slidably and rotatably associated with said first movable valve member, b. said first movable valve member being connected to said operator means for controlled linear movement therewith, c. said movable valve members each including fluid passage means adapted for communication upon linear displacement of said first movable valve member, d. fluid actuator means for rotating said second movable valve member and being connected to said fluid passage means of said valve members, e. at least some of said fluid passage means comprising diagonally disposed recesses formed in one of said movable valve members, whereby fluid flow achieved by linear displacement of said first valve member will energize said fluid actuator to effect rotary displacement of said second valve member thereby compensating for the fluid flow control effects caused by the linear displacement of the first valve member.

* * * * *